United States Patent
Eckl et al.

(10) Patent No.: US 6,478,494 B1
(45) Date of Patent: Nov. 12, 2002

(54) METHOD FOR PRODUCING A ROD-SHAPED COMPOSITE PART AND ROD-SHAPED COMPOSITE PART

(75) Inventors: Wilhelm Eckl, Karlsruhe (DE); Helmut Nagele, Pfinztal (DE); Jürgen Pfitzer, Pfinztal (DE); Norbert Eisenreich, Pfinztal (DE); Peter Eyerer, Karlsruhe (DE); Peter Elsner, Pfinztal (DE)

(73) Assignee: Fraunhofer-Gesellschaft zur Förderung der angewandten Forschung E. V, München (DE)

( * ) Notice: Subject to any disclaimer, the term of this patent is extended or adjusted under 35 U.S.C. 154(b) by 0 days.

(21) Appl. No.: 09/831,247
(22) PCT Filed: Nov. 4, 1999
(86) PCT No.: PCT/EP99/08435
§ 371 (c)(1), (2), (4) Date: Jul. 11, 2001
(87) PCT Pub. No.: WO00/27611
PCT Pub. Date: May 18, 2000

(30) Foreign Application Priority Data

Nov. 11, 1998 (DE) .......................................... 198 52 066

(51) Int. Cl.$^7$ .......................... B43K 19/14; B43K 19/16
(52) U.S. Cl. ...................... 401/96; 264/129; 264/176.1
(58) Field of Search ........................... 401/96; 264/129, 264/176.1, 211

(56) References Cited

U.S. PATENT DOCUMENTS

| 3,993,408 | A | * | 11/1976 | Arons et al. ................... 401/96 |
| 4,063,828 | A | * | 12/1977 | Mukai et al. .................. 401/96 |
| 5,244,297 | A | * | 9/1993 | Bachelet et al. .............. 401/96 |
| 5,531,947 | A | * | 7/1996 | Metzger et al. ............. 264/102 |
| 5,736,209 | A | | 4/1998 | Andersen |

FOREIGN PATENT DOCUMENTS

| GB | 420 368 | 11/1934 |
| WO | WO91 11335 | 8/1991 |
| WO | WO94 06 615 | 3/1994 |
| WO | WO98 06 785 | 2/1998 |
| WO | WOI98 35800 | 8/1998 |

\* cited by examiner

Primary Examiner—Timothy L. Maust
Assistant Examiner—Kathleen J. Prunner
(74) Attorney, Agent, or Firm—Paul Vincent

(57) ABSTRACT

A method for producing a substantially rod-shaped composite body (6) consists of a core (4) enveloped by at least one polymer, according to which the plasticized polymer (5) is extruded onto the core (4). At least one natural polymer is used and a sliding agent on the basis of native oils and/or waxes is added before or during extrusion. The method is used for the production of writing, drawing, cosmetic pencils.

17 Claims, 1 Drawing Sheet

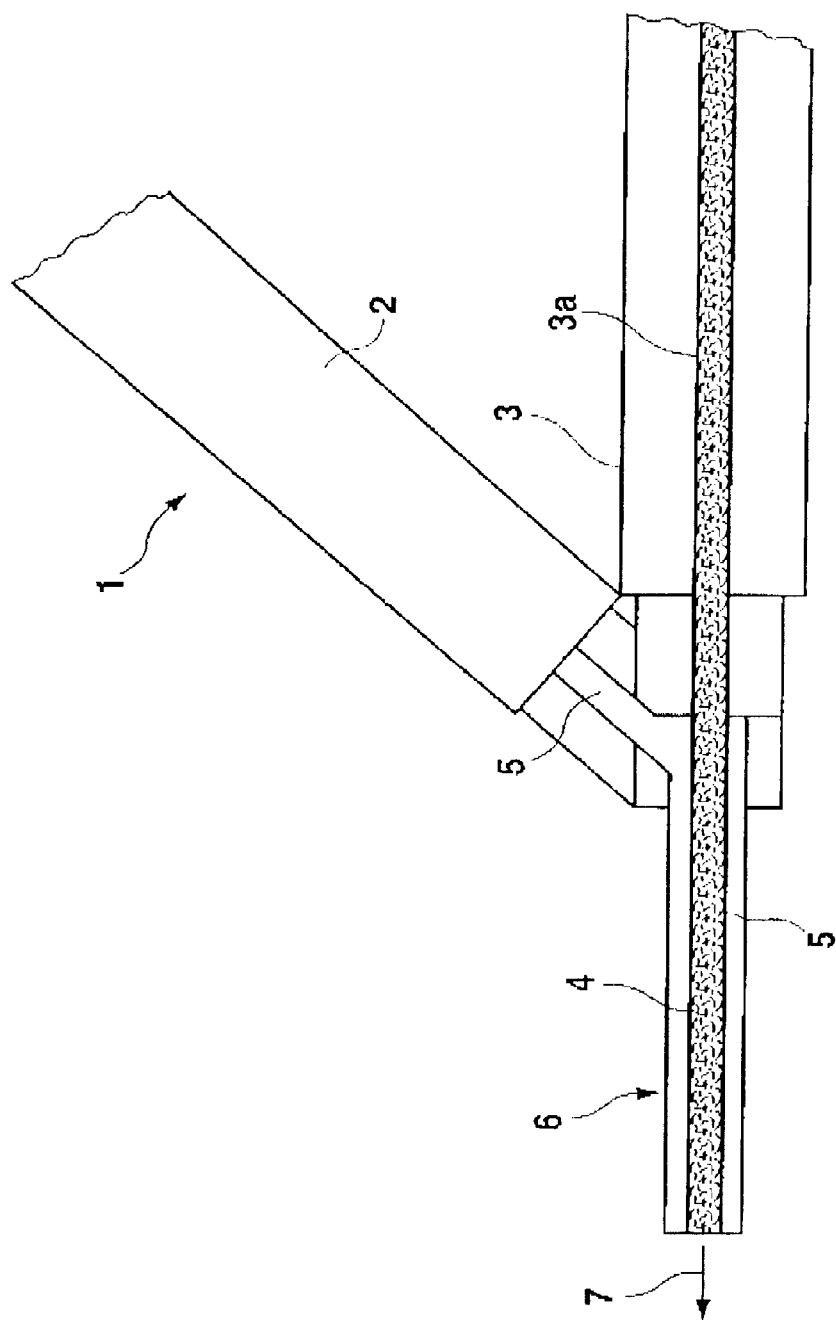

METHOD FOR PRODUCING A ROD-SHAPED COMPOSITE PART AND ROD-SHAPED COMPOSITE PART

BACKGROUND OF THE INVENTION

The invention concerns a method for producing a substantially rod-shaped composite body from a core surrounded by at least one polymer through plastification of the polymer and extruding same onto the continuously fed core.

Composite bodies of this type are known e.g. as writing and drawing instruments, such as pencils or colored pencils and as pencils for decorative cosmetics. The core is thereby formed by a coloring agent which is usually surrounded by massive wood. For producing such pencils, shells are formed from wooden blanks, a groove for receiving the coloring agent is milled into each shell and the shells are subsequently glued together and optionally painted. This method is demanding and expensive due to the many method steps and also produces a large amount of high-quality wood waste due to the cutting.

Pencils are also known with which the wood covering is replaced by synthetic polymers, such as artificial resins. They can be produced in an extrusion process, which is considerably easier. However, synthetic polymers are known to be ecologically disadvantageous. Due to the variety of materials used, the waste must be burned and the burning of synthetic polymers produces undesired $CO_2$ emissions. For the above-mentioned reasons, one would generally like to replace the largest possible amount of synthetic polymers with materials which are less harmful to the environment.

A further problem with the use of synthetic polymers, in particular for pencils and colored pencils, is the softeners with which the polymers must be mixed to be able to process them through extrusion and to improve their material properties. Most examples of the currently used softeners, such as phthalates, phosphates or adipates are harmful to the health or even toxic. In particular, the phthalates (which are most frequently used) are assumed to have an endocrine effect. The health risk, in particular for children who tend to chew on the pencils, is obvious since softeners generally volatilize in air, can easily loosen from the plastic and, in contact with saliva, are absorbed when chewing on such pencils.

For the above-mentioned reasons one is generally motivated to replace as much synthetic polymer as possible with environmentally friendly materials. WO 91/11 335A discloses manufacture of the shaft of a pencil substantially from ground wood pulp or wood dust, i.e., fine particle wood waste or from papermache with the addition of wood glue, bone glue or dispersion adhesive, wherein the material is injection molded or extruded onto the coloring agent. The proposed natural glues must be added in substantial quantities to obtain an injection moldable or extrudable mass and to guarantee attainment of the required properties of the pencil, i.e., good flexural strength and breaking strength. The natural glues used are only somewhat water-resistant. The shaft is therefore covered with plastic, rubber or paper.

GB 420 368 describes a method for the production of pencil shafts for the acceptance of a pencil lead, wherein wood fibers are disposed in a cellulose solution, a portion of the solvent is evaporated to produce a pasty matrix which is then shaped into the pencil shaft. Although the resulting pencil is substantially made from natural materials, the manufacturing procedure is demanding and expensive.

U.S. Pat. No. 5,736,206A discloses a method for the manufacture of plates made from a fiber reinforced starch matrix, wherein a watery mixture of starch, distilled cellulose, and fibers or filling materials are calendered with hot rollers. The plates are subsequently dried and further processed in dependence on the application: for example, cut to size, folded, perforated or the like. The plates principal use is for food and drink containers.

Finally, materials are known based on the natural lignin polymer. WO 98/35 800A1 describes a method for the manufacture of composite particles from lignin and cellulose, wherein lignin which is not dissolvable in water is brought into contact with ligno-cellulose at increased pressure and temperature.

SUMMARY OF THE INVENTION

It is the underlying purpose of the invention to propose a method for the production of a substantially rod-shaped composite body, wherein a polymer is plastified and extruded onto a continuously fed core, the method producing an environmentally friendly product using available raw materials. The invention is also directed to a composite body produced by a method of this type.

The method part of this object is achieved in accordance with the invention in that at least one natural polymer is used and a sliding agent comprising at least one of native oils and/or waxes is added to the plastified polymer before or during extrusion.

Natural polymers gained from grown resources, such as lignin, collagen, keratin, casein or chitin are harmless to the environment. They can easily be biologically disintegrated or composted, generally without residues, and have an ecologically neutral $CO_2$ balance, since burning of natural polymers emits an amount of $CO_2$ into the atmosphere which is not larger than the amount used during growth of the resources.

Materials on the basis of natural polymers or natural polymers modified through oxidation, enzyme treatment or the like, such as duroplasts of casein or thermoplastics of cellulose nitrates, acetates, esters and ethers are already known. A disadvantage of many known natural polymers is their material properties which are worse than those of most synthetic polymers, such as high brittleness, porosity or hygroscopic properties, wherein the latter is even increased through addition of softeners. In addition, these polymers often smell. The sliding agents on the basis of native oils or waxes, added in accordance with the invention before or during extrusion, have remedial action. The effect of the sliding agents corresponds to that of known synthetic softeners which only physically interact with the polymer due to their solvent or swelling properties, without chemical reaction therewith and form a homogeneous system together with the polymer. This improves the physical properties of the natural polymer, e.g. reduces the melting temperature, increases shapeability, increases the elastic properties, reduces brittleness and optionally increases adhesion.

In contrast to synthetic softeners on the basis of organic ester, native oils and waxes consist substantially of higher-molecular fatty acids or esters of higher-molecular fatty acids, e.g. glycerides, and are not or are only slightly toxic. Sliding agents obtained from growing resources have an ecologically neutral $CO_2$ balance. Addition of the inventive sliding agents leads to an extruded substance having a smooth surface. It is possible to considerably reduce the extrusion temperature through adding native oils or waxes which reduce the melting or flow transition region of the polymers such that the polymer undergoes less thermal loading during processing. A natural polymer mixed with native oils represents a high-quality material which is completely made from natural materials and which is environmentally friendly and biologically easily degradable or compostable.

In particular, the addition of native oils has turned out to have the surprising effect of reducing the otherwise unavoidable odor of most natural polymers. If part of the native oils is added as distilled oils, the odor is further reduced or even completely eliminated since the volatile low-molecular components contained in many natural polymers are bound such that a composite body consisting of natural polymers mixed with distilled oils must not be sealed, e.g. with paint. Distilled oils consist substantially of slightly volatile alcohols, aldehydes, ketones, esters, lactones, compounds containing sulfur and nitrogen as well as hydrocarbons.

In a preferred embodiment, lignin-based natural polymers are used. Lignin is a highly-molecular polyphenolic macromolecule which fills the spaces between the cell membranes in lignifying plants and turns them into wood, wherein a mixed body of high compression strength lignin and high tensile strength cellulose is produced. Lignin is characterized by considerably better material properties (e.g., high stability, rigidity and impact strength) than those of other natural polymers.

Large quantities of lignin are produced as a by-product in cellulose production and are therefore available in large amounts. Disintegration of wood produces lignosulphonic acids as part of the sulfite waste liquor in which the lignosulphonic acids are dissolved in the form of phenolates ("alkalilignin"). The lignin acid can be precipitated through treatment with sulfuric acid and carbon dioxide.

Due to its large availability, alkalilignin is preferably used. This material is obtained as powder during waste water treatment in cellulose processing through evaporation or it is used in solution, e.g. in alcohols, such as glycol. The lignin can thereby optionally contain further natural polymers, e.g. proteins or protein derivatives. It is also possible to use, in particular, a lignin-containing natural granulated matter (EP 0 720 634 B1) as obtained from stereochemical modification through treatment with organic acids, in particular acidic acid and which can be thermoplastically processed into shaped parts.

A preferred embodiment provides that native oils comprising at least one of rape, thistle, sun flower, hemp oil or menthol are used which improve the material properties of the utilized natural polymers and which are also hygienically harmless. Native oils from the above-mentioned group permit reduction of the extrusion temperature to 90° C. in the region of the input and 115° C. in the region of the output nozzle of the extruder.

A further preferred embodiment provides that the sliding agent is a wax comprising at least one of animal native waxes, such as bee wax, shellac wax, lanolin, spermaceti oil or the like or plant-based native waxes, such as carnauba wax, montanic wax, Japan wax, rice germ oil wax or the like are used which are liquid at extrusion temperature. Alternatively, chemically modified native waxes, such as jojoba waxes, montanic ester waxes or sasol waxes can also be used.

Depending on the polymer used, preferably between 1 and 15 mass %, in particular between 3 and 10 mass % of sliding agent, relative to the mass of the polymer used, are added.

If the inventive method is used, e.g., for the production of writing, drawing or cosmetic pencils, a further preferred embodiment provides that natural fibers are added to the plastified polymer before or during extrusion. The natural fibers modify the natural polymer in such a fashion, that it looks and feels like naturally grown wood and therefore meets the wishes and habits of the users. They also improve the cutting properties e.g. when sharpening a writing or cosmetic pencil. The combination of lignin mixed with native oils or waxes and cellulose fibers can hardly be distinguished from wood due to the wood-like character of lignin and the cellulose fibers contained in natural wood. In addition to at least one of cellulose fibers, wood, flax, sisal, miscanthus, ramie and/or hemp fibers can also be used as natural fibers. The composite body can optionally be coated in a conventional manner, e.g. painted, after extrusion.

The reduction of the extrusion temperature caused by the native oils has the further advantage that the added natural fibers can also be integrated in a thermally protective fashion. It is also recommended to choose a low extrusion speed.

The inventive method can be carried out continuously or in batches with, in particular, continuous processing, wherein the core is continuously fed and the plastified polymer is continuously co-extruded thereon.

The inventive method is suited not only for the production of substantially rod-shaped composite bodies in the form of writing, drawing or cosmetic pencils but also to produce cords having a textile or wire core, e.g. for washing lines, or cables having an insulating layer.

The invention finally concerns a rod-shaped composite body having a core surrounded by at least one polymer, in particular, a writing, drawing or cosmetic pencil manufactured by a method of the above mentioned kind which is characterized in that the polymer is a natural polymer based on lignin which is mixed with native oils and/or waxes. Due to its wood-like character and its thermoplastic processability, the lignin can be further mixed with natural fibers, such as cellulose fibers to render the material very similar to naturally grown wood with regard to its composition and surface properties. The inventive composite body can be coated, e.g., painted, in a known fashion.

The invention is described below with respect to an embodiment with reference to the drawings.

BRIEF DESCRIPTION OF THE DRAWINGS

The single FIGURE shows a schematic representation of the extrusion of a plastified polymer onto a continuously fed core by means of an extruder.

The extruder 1 comprises a screw-housing 2 for plastifying a natural polymer 5, in particular lignin, mixed with a sliding agent on the basis of native oils and/or waxes. It also comprises a housing part 3 having a substantially central opening 3a for guiding a continuous core 4, e.g. the coloring agent of a writing, drawing or cosmetic pencil, in the direction of arrow 7. The screw-housing 2 can have additional (not shown) feed points for adding natural fibers, such as cellulose fibers.

DESCRIPTION OF THE PREFERRED EMBODIMENT

The plastified polymer 5 mixed with native oils or waxes is extruded continuously onto the continuously fed core 4 thereby forming an inventive composite body 6.

I claim:

1. A method for producing a substantially rod-shaped composite body having a core surrounded by at least one polymer, the method comprising the steps of:

a) plastifying said at least one wherein said polymer is a natural polymer;

b) adding a sliding agent to said plastified polymer, said sliding agent comprising at least one of a native oil and a wax;

c) extruding said plastified polymer onto said core.

2. The method of claim 1, wherein step b) precedes step c).

3. The method of claim 1, wherein said natural polymer comprises a lignin base.

4. The method of claim 1, wherein said sliding agent is a native oil comprising at least one of rape, thistle, sun flower, hemp oil, and menthol.

5. The method of claim 1, wherein said sliding agent is a wax comprising an animal native wax including at least one of, bee wax, shellac wax, lanolin, and spermaceti oil.

6. The method of claim 1, wherein said sliding agent is a wax comprising a plant based native wax including at least one of carnauba wax, montanic wax, Japan wax, and rice germ oil wax.

7. The method of claim 1, wherein said sliding agent has a mass which is one of between 1 and 15 mass %, and between 3 and 10 mass %, relative to the mass of the polymer.

8. The method of claim 1, further comprising adding natural fibers to the plastified polymer.

9. The method of claim 8, wherein the natural fibers comprise at least one of cellulose, wood, flax, sisal, miscanthus, ramie, and hemp fibers are added to the polymer.

10. The method of claim 1, further comprising coating the composite body following step c).

11. The method of claim 1, wherein said core is continuously supplied and said polymer is continuously co-extruded.

12. The method of claim 1, being used for the production of one of a writing, drawing, and cosmetic pencil.

13. The method of claim 1, being used for the production of cosmetic pencils.

14. A rod-shaped composite body manufactured by the method of claim 1, the body comprising:

the core; and a polymer jacket surrounding said core, said polymer jacket having a natural lignin-based polymer mixed with at least one of native oil and wax.

15. The body of claim 14, wherein the body is one of a writing, drawing, and a cosmetic pencil.

16. The body of claim 14, wherein said polymer contains natural fibers.

17. The body of claim 14, further comprising a coating.

* * * * *